United States Patent
Hecht

(10) Patent No.: US 8,992,138 B2
(45) Date of Patent: Mar. 31, 2015

(54) CUTTING TOOL, CUTTING TOOL BODY AND CUTTING TOOL SUPPORT PAD THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 386 days.

(21) Appl. No.: 13/482,719

(22) Filed: May 29, 2012

(65) Prior Publication Data

US 2012/0315102 A1 Dec. 13, 2012

Related U.S. Application Data

(60) Provisional application No. 61/496,402, filed on Jun. 13, 2011.

(51) Int. Cl.
*B23B 51/00* (2006.01)

(52) U.S. Cl.
CPC ........... *B23B 51/00* (2013.01); *Y10T 408/5586* (2013.01); *B23B 2251/56* (2013.01)
USPC .......................................................... 408/83

(58) Field of Classification Search
CPC ............................ B23B 51/00; B23B 2215/56
USPC .................... 408/79, 80, 81, 82, 83, 199, 227
See application file for complete search history.

(56) References Cited

U.S. PATENT DOCUMENTS

| | | | |
|---|---|---|---|
| 3,998,566 A | 12/1976 | Williams | |
| 5,697,737 A | 12/1997 | Danielsson et al. | |
| 6,602,028 B1 | 8/2003 | Lindblom et al. | |
| 6,682,275 B1* | 1/2004 | Lindblom et al. | 408/59 |
| 7,207,750 B2* | 4/2007 | Annanolli et al. | 408/83 |
| 2006/0045640 A1* | 3/2006 | Hessman | 408/81 |
| 2010/0104385 A1* | 4/2010 | Nomura et al. | 408/83 |
| 2010/0158623 A1* | 6/2010 | Danielsson | 408/83 |

FOREIGN PATENT DOCUMENTS

| | | |
|---|---|---|
| DE | 8404345 U1 | 4/1985 |
| DE | 102009013270 B3 | 6/2010 |
| DE | 202010003288 U1 | 8/2010 |
| JP | 2001 212719 A | 8/2001 |
| JP | 2010 046734 A | 3/2010 |
| WO | WO 98/32564 A1 | 7/1998 |

OTHER PUBLICATIONS

International Search Report dated Oct. 11, 2012 issued in PCT counterpart application (No. PCT/IL2012/000202).

* cited by examiner

*Primary Examiner* — Daniel Howell
*Assistant Examiner* — Michael Vitale
(74) *Attorney, Agent, or Firm* — Womble Carlyle

(57) ABSTRACT

A cutting tool has at least one cutting tool support pad. The cutting tool support pad includes two opposing primary surfaces, each primary surface includes an abutment surface and at least one convex contact surface. For each primary surface, the at least one contact surface extends outwardly further than the abutment surface.

21 Claims, 2 Drawing Sheets

CUTTING TOOL, CUTTING TOOL BODY AND CUTTING TOOL SUPPORT PAD THEREFOR

RELATED APPLICATIONS

The present application claims priority to U.S. Provisional Application No. 61/496,402, filed Jun. 13, 2011, whose contents are incorporated by reference in their entirety.

FIELD OF THE INVENTION

The subject matter of the present application relates to support pads for cutting tools.

BACKGROUND OF THE INVENTION

Cutting tool support pads, sometimes referred to as "wear pads" or "guide pads", are known to improve stability, provide guidance, and in some cases, improve the surface quality of a workpiece.

Known support pads are replaceable and indexable, and have a first side with convexly curved contact surfaces, the first side being designed to engage the workpiece, and, on an opposing, second side thereof, a flat abutment surface via which the support pad is seated on the cutting tool.

U.S. Pat. No. 5,697,737 discloses such a support pad.

SUMMARY OF THE INVENTION

In accordance with the subject matter of the present application, there is provided a cutting too support pad which includes:
  opposing first and second primary surfaces spaced apart along a first axis of the cutting tool support pad,
  a pad peripheral surface extending between the first and second primary surfaces, and
  a median plane which is perpendicular to the first axis, located between the first and second primary surfaces, and cuts through the pad peripheral surface.

Each primary surface includes an abutment surface and at least one convex contact surface and the at least one convex contact surface extends outwardly away from the median plane further than the abutment surface.

In accordance with the subject matter of the present application, there is provided a cutting tool body which has a longitudinal rotation axis which extends therethrough and defines a forward-to-rear direction. The cutting tool body includes a tool peripheral surface at a peripheral portion thereof, at least one cutting portion and at least one guiding portion distinct from the at least one cutting portion. The at least one guiding portion includes at least one support pad pocket disposed at the peripheral portion.

The support pad pocket includes:
  a support surface located closer than the tool peripheral surface to the rotation axis,
  a side wall which extends between the support surface and the tool peripheral surface,
  an end wall connected to the side wall and extends between the support surface and the tool peripheral surface, and
  a support surface recess formed in the support surface.

In accordance with the subject matter of the present application, there is provided a cutting tool which includes the cutting tool body a support pad secured in the support pad pocket.

The abutment surface of one primary surface abuts the support surface, the pad peripheral surface abuts the end wall and the side wall and the at least one convex contact surface of the said one primary surface is located in the support surface recess.

BRIEF DESCRIPTION OF THE DRAWINGS

For a better understanding of the subject matter of the present application and to show how the same may be carried out in practice, reference will now be made to the accompanying drawings, in which.

Figure 1:
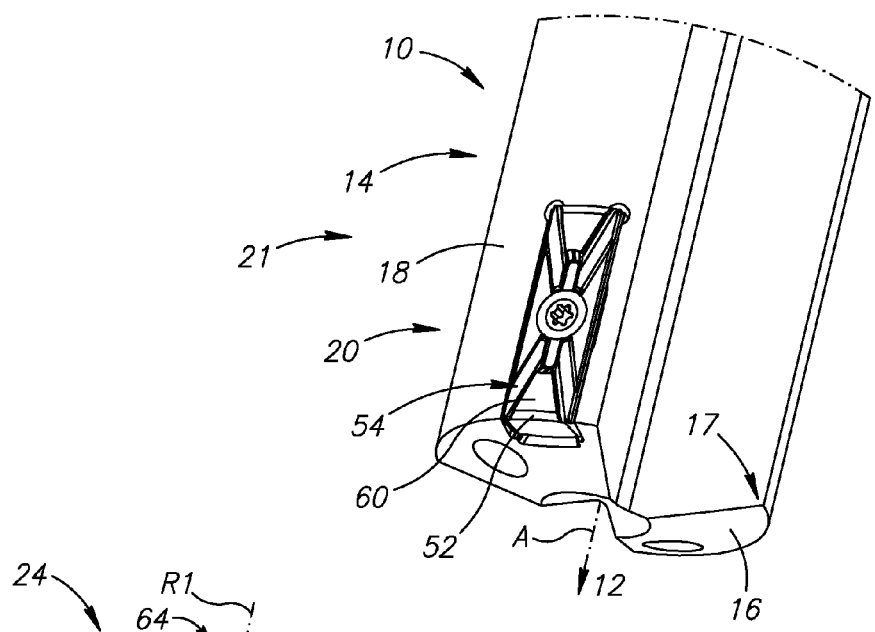
FIG. 1 is an isometric view of a portion of a cutting tool having a guiding portion.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

Figure 2:
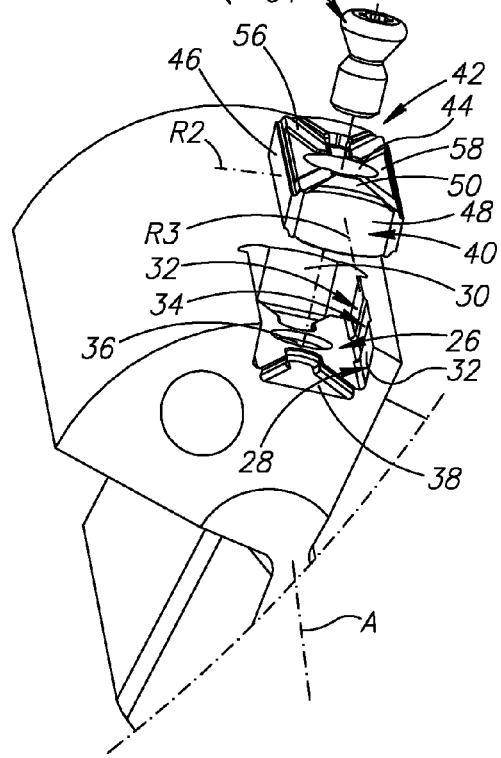
FIG. 2 is an isometric exploded view of a part of the portion of the cutting tool of FIG. 1.

Attention is drawn to FIGS. 1 and 2. A rotation axis A extends longitudinally through the center of a cutting tool 10. An arrow designated with the numeral 12 and coaxial with rotation axis A, indicates a so-called forward direction, and a right hand rotation direction.

The cutting tool 10 includes a cutting tool body 14.

The cutting tool body 14 can include a forwardly facing head surface 16, a tool peripheral surface 18 which extends rearwardly therefrom, and one or more guiding portions 20 located along a peripheral portion 21 of the cutting tool body 14.

Each guiding portion 20 is formed with a support pad pocket 22 and includes a cutting tool support pad 24 secured therein.

In addition to guiding portions, it is understood that the cutting tool body 14 can also include one or more cutting portions 17 distinct from the guiding portions and proximate flutes of the tool body. The guiding portions may be diametrically opposed to the cutting portions in an axial view of the cutting tool. As is known to those skilled in the art, such cutting portions may each be provided with a cutting insert pocket into which one or more cutting inserts may be seated. Since the present disclosure focuses on the guiding portions, details of the cutting portions have not been shown or further described.

Attention is drawn to FIGS. 1 and 2. The support pad pocket 22 opens out to the tool peripheral surface 18 and can open out to the head surface 16. The support pad pocket 22 can include a support surface 26, a side wall 28, an inner wall 31 and an end wall 30. The inner wall 31 may be opposite the side wall 28. The support surface 26 can extend rearwardly from the head surface 16 and can face radially outwardly. At least a portion of the support surface 26 can be planar. The support surface 26 is located closer than the tool peripheral surface 18 to the rotation axis A. The side wall 28 and the end wall 30 can extend from the support surface 26 to the tool peripheral surface 18. The side wall 28 can connect transversely with the end wall 30. The side wall 28 and the end wall 30 can be perpendicular to the support surface 26. The side wall 28 can face the rotation direction and the end wall 30 can face forwardly. When the cutting tool support pad 24 is in place, it abuts side wall 28 and is spaced apart from the inner wall 31.

In order to prevent the cutting tool support pad 24 from becoming over constrained, the side wall 28 can include two wall segments 32 separated by a wall recess 34.

The support pad pocket 22 can be formed with a threaded screw bore 36 in the support surface 26. The support surface 26 includes at least one support surface recess 38. The support surface 26 can include two support surface recesses 38 located on opposite sides of the screw bore 36. In a plan view of the support pad pocket 22, each support surface recess 38 is located between two support surface portions 39 of the support surface 26. The two support surface portions 39 of the support surface 26 and the support surface recess 38 therebetween can all intersect a radial plane which is orientated perpendicular to the rotation axis A. The support surface portions 39 of the support surface 26 can be planar. A radially innermost bottom of the at least one support surface recess 38 is located closer than the support surface 26 to the rotation axis A. The at least one support surface recess 38 is configured to accommodate at least one convex curved portion of the cutting tool support pad 24, when it is secured in the support pad pocket 22.

When the cutting tool support pad 24 is secured in the support pad pocket 22, the support surface 26, the side wall 28 which faces the rotation direction, and the end wall 30 are the only surfaces of the support pad pocket 22 which engage the cutting tool support pad 24.

Figure 4:
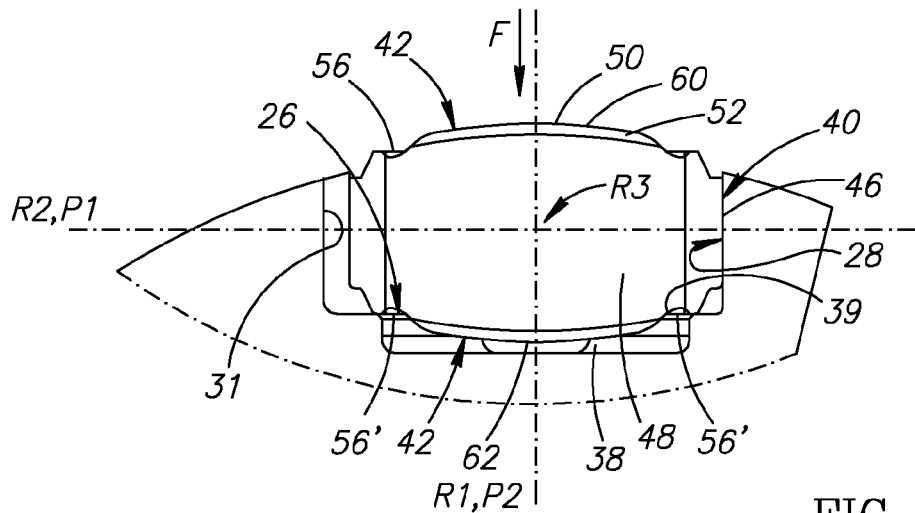
FIG. 4 is an end view of the guiding portion of FIGS. 1 and 2.
Figure 5:
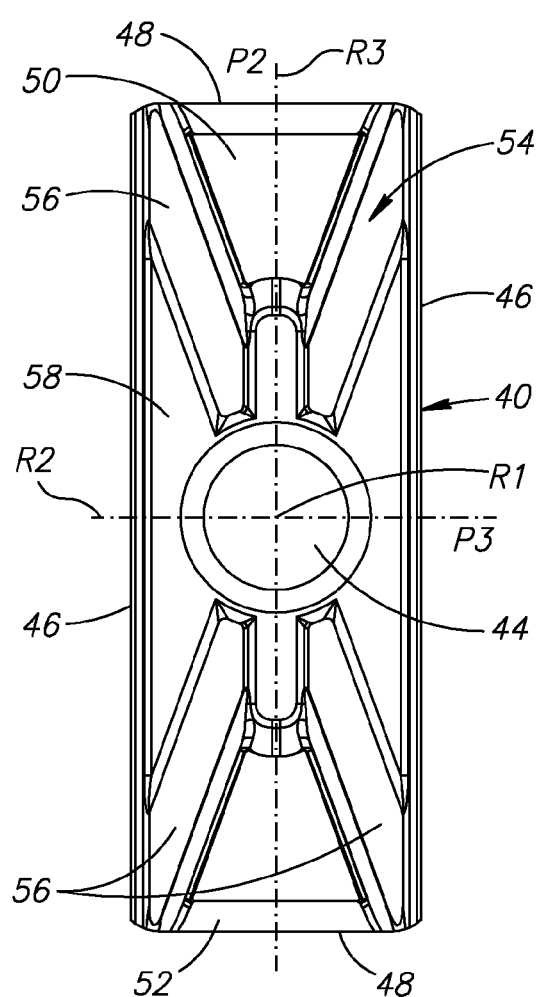
FIG. 5 is a plan view of a cutting tool support pad of the guiding portion of FIGS. 1, 2 and 4.

Attention is drawn to FIGS. 4 and 5. The cutting tool support pad 24 includes opposing primary surfaces 42 and a pad peripheral surface 40 which extends therebetween.

The primary surfaces 42 can each have 180° rotational symmetry about a first axis R1 which passes therethrough. The first axis R1 can be oriented perpendicular to the primary surfaces 42.

The cutting tool support pad 24 can have at least one through screw hole 44 which opens out to both primary surfaces 42. The screw hole 44 can be co-axial with the first axis R1.

The pad peripheral surface 40 can include two opposing secondary surfaces 46. The secondary surfaces 46 can have 180° rotational symmetry about a second axis R2 passing therethrough. The secondary surfaces 46 can be planar.

The pad peripheral surface 40 can include two opposing end surfaces 48. Each end surface 48 can extend between the secondary surfaces 46. The end surfaces 48 can have 180° rotational symmetry about a third axis R3 passing therethrough.

The cutting tool support pad 24 can have 180° rotational symmetry about the first, second and third axes R1, R2, R3. The second axis R2 is perpendicular to the first axis R1. The third axis R3 is perpendicular to the first and second axes R1, R2.

A median plane P1, which is perpendicular to first axis R1 and located mid-way between the opposing primary surfaces 42, is defined by the second and third axes R2 and R3. The median plane P1 passes through the pad peripheral surface (40). A longitudinal plane P2, which is perpendicular to the second axis R2 and located mid-way between the opposing secondary surfaces 46, is defined by the first and third axes R1 and R3. Finally, a lateral plane P3, which is perpendicular to the third axis R3 and located mid-way between the opposing end surfaces 48, is defined by the first and second axes R1 and R2. The cutting tool support pad 24 may have mirror symmetry about each of the planes P1, P2 and P3.

As seen in FIG. 4, each primary surface 42 includes at least one convex contact surface 50. As seen in FIG. 5, each contact surface 50 can be located adjacent to a given end surface 48.

Each primary surface 42 can include a chamfer edge 52 adjacent each convex contact surface 50. The chamfer edge 52 can extend between the contact surface 50 and the pad peripheral surface 40. The chamfer edge 52 can lead, or guide, the cutting tool support pad 24 and consequently the cutting tool 10, into a pre-drilled hole in the workpiece.

Attention is drawn to FIGS. 4 and 5. Each primary surface 42 includes an abutment surface 54. The abutment surface 54 faces outwardly and is located closer than the contact surface 50 to the median plane P1. In other words, the contact surface 50 extends outwardly away from the median plane P1 further than the abutment surface 54.

Each abutment surface 54 can include a plurality of abutment sub-surfaces 56. The plurality of abutment sub-surfaces 56 can be four abutment sub-surfaces 56, which can be identical to one another. The abutment sub-surfaces 56 can be arranged around the screw hole 44. The abutment sub-surfaces 56 can be co-planar. In a plan view of the primary surface 42 each abutment sub-surface 56 can have a straight shape. In a plan view of the primary surface 42 (see FIG. 5), every two adjacent straight abutment sub-surfaces 56 can converge inwards, towards the center of the primary surface 42 and in the direction of the first axis R1. Each abutment sub-surface 56 can extend between the pad peripheral surface 40 and the screw hole 44. Each abutment sub-surface 56 can extend from a secondary surface 46 to the screw hole 44.

Each primary surface 42 can include relief surfaces 58 for the abutment sub-surfaces 56. The relief surfaces 58 are located closer than the abutment surface 54 to the median plane P1. In a plan view of the primary surface 42, each relief surface 58 can be located between two abutment sub-surfaces 56 located on opposite sides of the lateral plane P3.

In a plan view of the primary surface 42, at least a portion of a given contact surface 50 is located between opposing abutment sub-surfaces 56 located on opposite sides of the longitudinal plane P2. The portion of the contact surface 50 located between opposing abutment sub-surfaces 56 can be configured for engagement with a workpiece during machining.

A possible advantage of this arrangement can be that abutment forces between the cutting tool support pad 24 and the support pad pocket 22 can be dispersed.

In a plan view of a given primary surface 42, a contact surface 50 thereof can be located directly above an area of the other primary surface 42 which is disposed between two corresponding abutment sub-surfaces 56' of the other primary surface 42. The at least portion of each contact surface 50, and the corresponding abutment sub-surfaces 56', can be arranged along the third axis R3 at the same axial distance from the longitudinal plane P3.

When the cutting tool support pad 24 is in a secured position in the support pad pocket 22, the cutting tool support pad 24 can have a single operative portion 60, which is positioned to take part in a machining process, and multiple non-operative portions 62, which are not. In the example shown, the cutting tool support pad 24 can have four different orientations, and thus can be considered to be four-way indexable. The cutting tool support pad 24 can be secured in the support pad pocket 22 in a first orientation. The cutting tool support pad 24 can be removed from the support pad pocket 22, rotated 180° about axis R1 and secured to the support pad pocket 22 in a second orientation. The cutting tool support pad 24 can then be removed from the support pad pocket 22 again, rotated 180° about axis R2 or R3 and secured to the support pad pocket 22 in a third orientation. Such change of orientation alternates the primary surface 42 of the cutting tool support pad 24 which faces outward from the cutting tool body 14. The cutting tool support pad 24 can then be removed from the support pad pocket 22 again, rotated 180° about axis R1 and secured to the support pad pocket 22 in a fourth orientation.

It will be understood that the specific order of the changes of orientation described above is for ease of understanding only, and that the rotation of the cutting tool support pad 24 about any of the axes can be carried out in any desired order. It will also be understood that the specific angle of rotation being 180° is appropriate for the example shown. As will be appreciated, the cutting tool support pad 24 can be rotated about a first axis to provide two alternative operating orientations, and rotated about a second axis, perpendicular to the first, to provide at least one additional orientation.

Stated differently, the subject matter of the present application can provide a reversible cutting tool support pad 24 which can be operative when rotated about axes R2 or R3 ("flipped"), and/or rotated about axis R1.

In any of these orientations, a single contact surface 50 can be considered the operative portion 60 and the other contact surfaces 50 can be considered non-operative portions 62.

When rotated about axis R1, two contact surfaces 50 on a single primary surface 42 alternate as the operative portion 60.

When flipped, contact surfaces 50 on a different primary surface 42 alternate as the operative portion 60, or operative contact surface 60.

In order to provide relief for a non-operative portion 62 of the cutting tool support pad 24, the support surface 26 can be inclined with respect to the rotation axis A. The support surface 26 may be inclined such that it is located radially farther from the rotation axis A in areas closest to the forwardly facing head surface 16, than in areas axially rearward of the head surface 16. Consequently, the operative portion 60 can be located radially farther from the rotation axis A than any non-operative portion 62. The operative portion 60 is the only portion of the cutting tool support pad 24 which engages a workpiece in a machining process.

The non-operative portions 62 can be defined as any contact surface 50 on the outwardly facing primary surface 42, which is located closer to the rotation axis A than the operative contact surface 60, and any contact surface 50 on the primary surface 42 which faces inward towards the rotation axis A.

In the secured position, the cutting tool support pad 24 can be configured to be secured in the support pad pocket 22 via a screw 64 screwed into the threaded screw bore 36 in the support surface 26. The abutment surface 54 of a primary surface 42 which faces the rotation axis A abuts the support surface 26. A secondary surface 46 which faces opposite the rotation direction abuts the side wall 28. An end surface 48 which faces rearwardly abuts the end wall 30. Each contact surface 50 which faces the rotation axis A is located in a respective support surface recess 38 in the support pad pocket 22.

Figure 3:
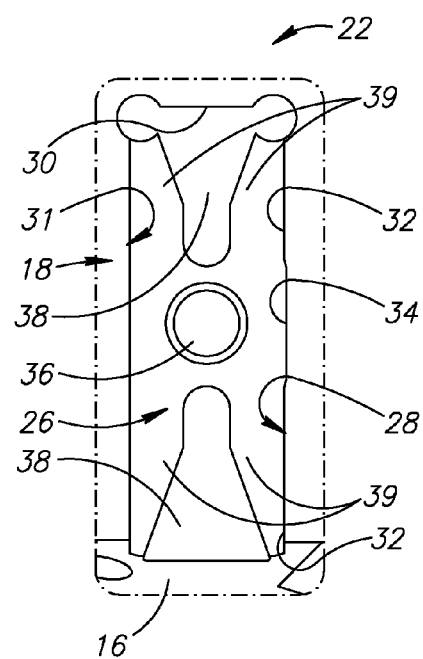
FIG. 3 is a plan view of a support pad pocket of the guiding portion of FIG. 1.

During machining, the corresponding abutment sub-surfaces 56', or operative abutment sub-surfaces 56', abut the support surface 26. The location of the operative abutment sub-surfaces 56' with respect to the operative contact surface 60 allows counteracting of perpendicular machining forces (marked as F in FIG. 3), which are applied on the operative contact surface 60.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool support pad (24) having a first axis (R1) and comprising:
   opposing first and second primary surfaces (42) spaced apart along the first axis (R1);
   a pad peripheral surface (40) extending between the first and second primary surfaces (42); and
   a median plane (P1) being perpendicular to the first axis (R1), located between the first and second primary surfaces (42), and passing through the pad peripheral surface (40);
   wherein:
   each primary surface (42) comprises an abutment surface (54) and at least one convex contact surface (50); and
   the at least one convex contact surface (50) extends outwardly away from the median plane (P1) further than the abutment surface (54).

2. The cutting tool support pad (24) according to claim 1, wherein the primary surfaces (42) have 180° rotational symmetry about the first axis (R1).

3. The cutting tool support pad (24) according to claim 1, wherein the primary surfaces (42) have mirror symmetry about the median plane (P1).

4. The cutting tool support pad (24) according to claim 1, wherein each abutment surface (54) comprises a plurality of abutment sub-surfaces (56).

5. The cutting tool support pad (24) according to claim 4, wherein each abutment surface (54) comprises four abutment sub-surfaces (56).

6. The cutting tool support pad (24) according to claim 4, wherein each of the abutment sub-surfaces (56) is planar.

7. The cutting tool support pad (24) according to claim 4, wherein the plurality of abutment sub-surfaces (56) are co-planar.

8. The cutting tool support pad (24) according to claim 4, wherein in a plan view of each of the primary surfaces (42), at least a portion of each of the at least one convex contact surface (50) is located between two abutment sub-surfaces (56).

9. The cutting tool support pad (24) according to claim 8, wherein in a plan view of a given primary surface (42), a contact surface (50) thereof is located directly above an area of the other primary surface (42) which is disposed between two corresponding abutment sub-surfaces (56') of said other primary surface (42).

10. The cutting tool support pad (24) according to claim 4, wherein in a plan view of each primary surface (42), the abutment sub-surfaces (56) are straight.

11. The cutting tool support pad (24) according to claim 4, wherein in a plan view of each primary surface (42), the abutment sub-surfaces (56) are straight and converge towards a center of said each primary surface (42).

12. The cutting tool support pad (24) according to claim 1, wherein:
   the pad peripheral surface (40) comprises two opposing secondary surfaces (46) and two opposing end surfaces (48) extending therebetween;

the two opposing secondary surfaces (46) have 180° rotational symmetry about a second axis (R2) which passes therethrough and is perpendicular to the first axis (R1); and the two opposing end surfaces (48) have 180° rotational symmetry about a third axis (R3) which passes therethrough and is perpendicular to both the first axis (R1) and the second axis (R2).

13. The cutting tool support pad (24) according to claim 12, wherein the secondary surfaces (46) are planar.

14. A cutting tool body (14) having a longitudinal rotation axis A extending therethrough and defining a forward-to-rear direction, the cutting tool body (14) comprising a tool peripheral surface (18) at a peripheral portion (21) thereof, at least one cutting portion (17) and at least one guiding portion (20) distinct from the at least one cutting portion, the at least one guiding portion comprising at least one support pad pocket (22) disposed at the peripheral portion (21), wherein the support pad pocket (22) comprises:
 a support surface (26) located closer than the tool peripheral surface (18) to the rotation axis A;
 a side wall (28) extending between the support surface (26) and the tool peripheral surface (18);
 an end wall (30) connected to the side wall (28) and extending between the support surface (26) and the tool peripheral surface (18); and
 a plurality of support surface recesses (38) formed in the support surface (26).

15. The cutting tool body (14) according to claim 14, wherein in a plan view of the support pad pocket (22), each of the support surface recesses (38) is located between two support surface portions (39) of the support surface (26); and
 the two support surface portions (39) of the support surface (26) and the support surface recess (38) therebetween intersect a radial plane which is perpendicular to the rotation axis A.

16. The cutting tool body (14) according to claim 14, wherein the cutting tool body (14) comprises two support surface recesses (38), each located between corresponding two support surface portions (39) of the support surface (26).

17. The cutting tool body (14) according to claim 14, wherein the side wall (28) comprises two spaced apart side wall segments (32) separated by a side wall recess (34).

18. The cutting tool body (14) according to claim 14, wherein the support surface (26) is inclined such that it is located radially farther from the rotation axis A in areas closest to a forwardly facing head surface (16), than in areas axially rearward of the head surface (16).

19. A cutting tool (10) comprising:
 a cutting tool body (14); and
 a cutting tool support pad (24) secured in the support pad pocket (22) of the cutting tool body (14); wherein:
the cutting tool body has:
 a longitudinal rotation axis A extending therethrough and defining a forward-to-rear direction, the cutting tool body (14) comprising a tool peripheral surface (18) at a peripheral portion (21) thereof, at least one cutting portion (17) and at least one guiding portion (20) distinct from the at least one cutting portion, the at least one guiding portion comprising at least one support pad pocket (22) disposed at the peripheral portion (21), wherein the support pad pocket (22) comprises:
a support surface (26) located closer than the tool peripheral surface (18) to the rotation axis A;
a side wall (28) extending between the support surface (26) and the tool peripheral surface (18);
an end wall (30) connected to the side wall (28) and extending between the support surface (26) and the tool peripheral surface (18); and
a support surface recess (38) formed in the support surface (26); and
the cutting tool support pad has a first axis (R1) and comprises:
 opposing first and second primary surfaces (42) spaced apart along the first axis (R1);
 a pad peripheral surface (40) extending between the first and second primary surfaces (42); and
 a median plane (P1) being perpendicular to the first axis (R1), located between the first and second primary surfaces (42), and passing through the pad peripheral surface (40);
 wherein:
 each primary surface (42) comprises an abutment surface (54) and at least one convex contact surface (50); and
 the at least one convex contact surface (50) extends outwardly away from the median plane (P1) further than the abutment surface (54); and
the abutment surface (54) of one primary surface (42) of the cutting tool support pad (24) abuts the support surface (26) of the cutting tool body (14).

20. The cutting tool (10) according to claim 19, wherein:
the pad peripheral surface (40) of the cutting tool support pad (24) abuts the end wall (30) and the side wall (28); and
the at least one convex contact surface (50) of the said one primary surface (42) is located in the support surface recess (38).

21. The cutting tool (10) according to claim 19, wherein the support surface (26), the side wall (28) and the end wall (30) are the only surfaces in the support pad pocket (22) which abut the cutting tool support pad (24).

* * * * *